Dec. 4, 1923.  
P. P. CRABILL ET AL  
BUMPER FOR AUTOMOBILES  
Filed Oct. 13, 1922  
1,476,053  
2 Sheets-Sheet 2

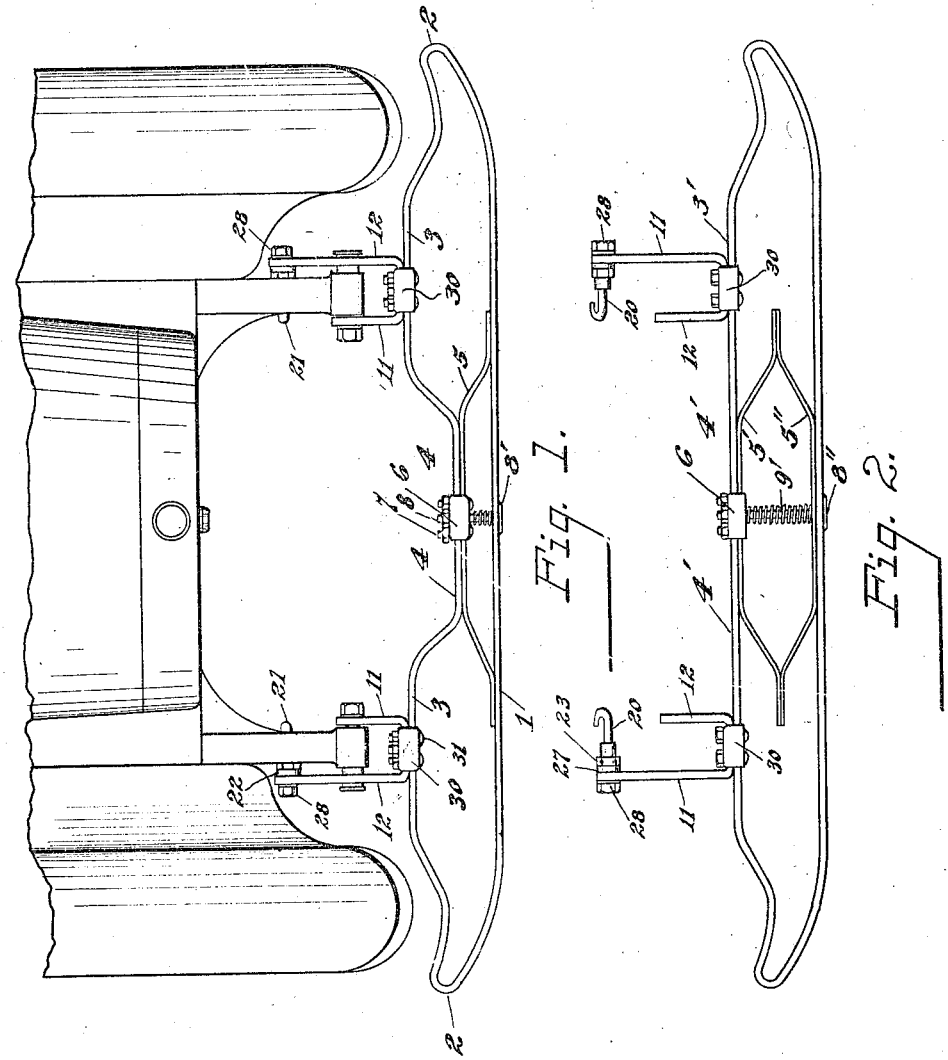

Patented Dec. 4, 1923.

1,476,053

UNITED STATES PATENT OFFICE.

PEARL P. CRABILL AND JAMES TURNER, OF SPRINGFIELD, OHIO.

BUMPER FOR AUTOMOBILES.

Application filed October 13, 1922. Serial No. 594,256.

*To all whom it may concern:*

Be it known that we, PEARL P. CRABILL and JAMES TURNER, citizens of the United States, residing at Springfield, in the county of Clark and State of Ohio, have invented certain new and useful Improvements in Bumpers for Automobiles, of which the following is a specification.

This invention relates to improvements in bumpers for automobiles, and it particularly relates to that type of bumper in which the bumper bar is constructed of resilient material, and in which the bar is attached to the vehicle frame by devices which permit adjustment of the bar as to height.

An object of the invention is to provide for reinforcing the main bumper bar in a simple and effective manner, a further object in this connection being to provide for connecting the reinforcing element with the bar in a way which will prevent rattling of the parts and permit the ready assembling of the parts.

A further object of the invention is to provide means for connecting the bumper bar and its reinforcement with the vehicle in a manner which will be simple and effective and which will permit of the necessary adjustment to permit the bar to be properly positioned as to height.

In the accompanying drawings:

Fig. 1 is a top plan view of a bumper embodying the improvements shown applied to a motor vehicle.

Fig. 2 is a top plan of a modification.

Figure 3:
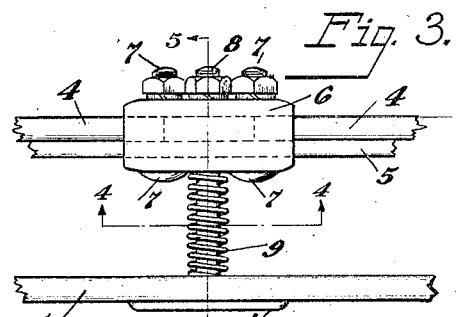
Fig. 3 is an enlarged top plan of a portion of the bumper shown in Fig. 1.
Figure 5:
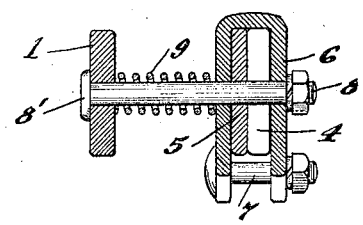

Fig. 5 is a section on the line 5—5 of Fig. 3.

Figure 6:
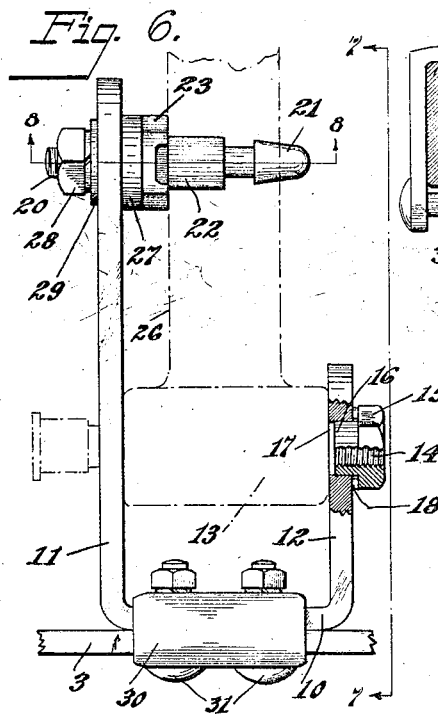

Fig. 6 is a top plan view; partly in section, of one of the devices which secure the bumper to the vehicle frame, with a portion of the frame shown in dotted lines.

Figure 7:
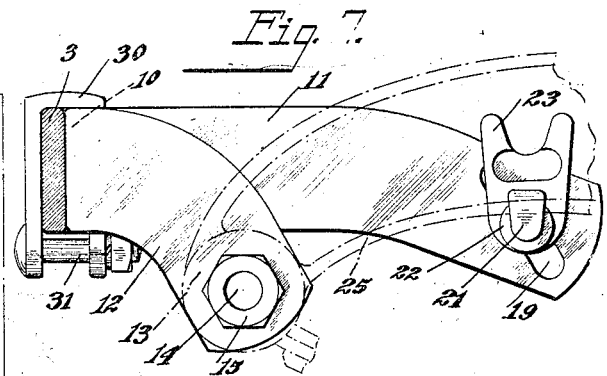

Fig. 7 is a side view of the same.

Figure 8:
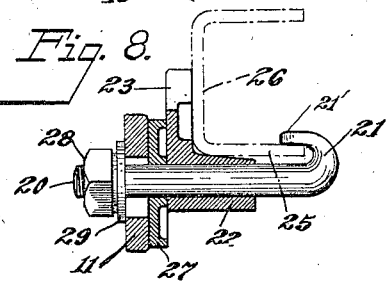

Fig. 8 is a section on the line 8—8 of Fig. 6.

Figure 4:
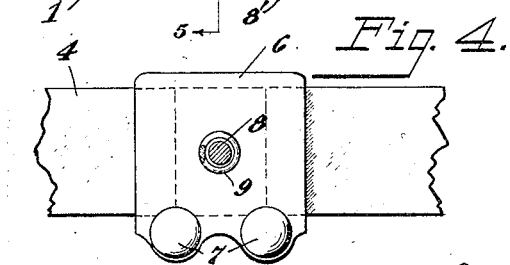
Fig. 4 is a section on the line 4—4 of Fig. 3.

Referring to the drawings, 1 represents the central portion of a flat, spring steel bar which forms the front portion of the bumper. This front portion is bent at its ends, as indicated at 2, to form rear portions which extend in the general direction of the main portion. Each of these rear portions has a straight horizontal part 3 to which the devices are secured which attach the bumper to the vehicle and is then bent inwardly toward the main portion and again parallel therewith, as indicated at 4, the extreme inner ends approaching each other in comparatively close proximity, as shown in dotted lines in Figs. 3 and 4. A flat spring bar 5 is placed between the front and rear portions of the main bumper bar, with its central portion arranged parallel with and lying against the end portions 4 and its ends arranged parallel with and lying against the rear side of the front portion 1. A U-shaped clip 6 embraces the central portion of the spring 5 and end portions 4 and is clamped thereto by the bolts 7. A bolt 8 projects loosely through the front bar 1, spring 5, and clip 6, between the end portions 4, the head of the bolt being of an elongated character, as indicated at 8' to present a pleasing appearance on the forward side of the bar 1. A comparatively light coil spring 9 is placed about the bolt 8 between the clip 6 and bar 1. The bolt and spring hold the parts in proper spaced relation so far as separation is concerned, but permit them to yield toward each other under pressure, and the spring acts to prevent rattling occasioned by any looseness of the parts.

A modification in the form of the bumper bar is shown in Fig. 2. In this construction the offset inner ends 4 are eliminated and the portion 3 carried on straight lines in parallel relation with the front bar, as indicated at 3' and 4'. A longer bolt 8" and spring 9' are employed and a pair of spring bars 5' and 5" are inserted between the front and rear portions of the bumper bar, with the central portions of these spring bars lying parallel with and against the respective front and rear bumper bar parts and the ends of the spring arranged in parallel relation and against each other.

For the purpose of attaching the bumper bar to the automobile frame a pair of double-armed brackets, one at each end of the bar, are employed. Each of these brackets consists of a central horizontal-extending portion 10, bent rearwardly to form arms 11 and 12. The arm 12 projects downwardly at an angle and is attached to the extreme forward end of the frame 13 by the spring bolt 14, having a special nut 15, which has an extension 16 which projects into a circular opening 17 in the arm 12, with a lock washer 18 between the nut and arm. The other arm 11 projects rearwardly in a horizontal direction with its rear end bent downwardly at a slight angle having a slotted opening 19 inclined forwardly and downwardly. This arm 11 is clamped to the frame by a bolt 20 having a hook-shaped end 21, and a wedge member consisting of a portion 22 loosely sleeved on the bolt having a vertically-extending integrally formed plate 23. The hook 21 is flattened, as indicated at 21' in Fig. 8 and this flattened portion engages the upper surface of the lower flange 25 of the channel frame; the sleeve 22, which has its upper surface inclined as best shown in Fig. 8, impinges the lower surface of the flange 25; and the plate 23, which is preferably of a bifurcated nature, lies against the outer surface of the web 26 of the frame. The bolt projects through the slot 19, a spacing washer 27 is inserted between the arm 11 and the plate 23, and the parts clamped together by a nut 28 on the outer end of the nut, with a lock washer 29 between the nut and arm. The slotted opening permits the arm 11 to be clamped at different heights and thus provide for positioning the buffer bar at the proper height.

Each of these brackets is secured to a portion 3 of the buffer bar by a U-shaped clamp 30, which clamps the intermediate portion 10 of the bracket in parallel relation to the portion 3 by the bolts 31.

Having thus described our invention, we claim:

In a bumper, a rearwardly-extending attaching member having an opening, a bolt extending through said opening and having a hook-shaped end with a flattened face to engage the upper surface of the lower flange of the channel frame, a sleeve member on said bolt having an inclined face to engage the lower surface of said flange, said sleeve having a plate to clamp the web of said frame, and a nut on said bolt to draw the parts together.

In testimony whereof we have hereunto set our hands this 26th day of September 1922.

PEARL P. CRABILL.
JAMES TURNER.